(12) United States Patent
Lustig et al.

(10) Patent No.: US 12,546,842 B2
(45) Date of Patent: Feb. 10, 2026

(54) SENSING MOTION IN MRI USING RF INTERMODULATION

(71) Applicant: THE REGENTS OF THE UNIVERSITY OF CALIFORNIA, Oakland, CA (US)

(72) Inventors: Shimon M. Lustig, Moraga, CA (US); Suma Mandayam Anand, Berkeley, CA (US); Alan Dong, San Francisco, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 226 days.

(21) Appl. No.: 18/546,411

(22) PCT Filed: Feb. 17, 2022

(86) PCT No.: PCT/US2022/016687
§ 371 (c)(1),
(2) Date: Aug. 14, 2023

(87) PCT Pub. No.: WO2022/178050
PCT Pub. Date: Aug. 25, 2022

(65) Prior Publication Data
US 2024/0133988 A1 Apr. 25, 2024
US 2024/0230813 A9 Jul. 11, 2024

Related U.S. Application Data

(60) Provisional application No. 63/150,423, filed on Feb. 17, 2021.

(51) Int. Cl.
G01R 33/565 (2006.01)
G01R 33/36 (2006.01)

(52) U.S. Cl.
CPC ... *G01R 33/56509* (2013.01); *G01R 33/3621* (2013.01)

(58) Field of Classification Search
CPC .................. G01R 33/3621; G01R 33/56509
See application file for complete search history.

(56) References Cited

U.S. PATENT DOCUMENTS

| | | | |
|---|---|---|---|
| 10,139,466 B2 * | 11/2018 | Trzasko | G01R 33/4828 |
| 11,360,179 B2 * | 6/2022 | Dagher | G01R 33/56391 |
| 2007/0139040 A1 | 6/2007 | Jones et al. | |
| 2008/0056337 A1 | 3/2008 | Tal et al. | |
| 2008/0205730 A1 * | 8/2008 | Stehning | G01R 33/56509 382/131 |
| 2016/0374622 A1 | 12/2016 | Lin et al. | |
| 2020/0018808 A1 | 1/2020 | Ji | |

OTHER PUBLICATIONS

International Search Report and Written Opinion, PCT/US2022/016687, May 18, 2022.

* cited by examiner

*Primary Examiner* — Gregory H Curran
(74) *Attorney, Agent, or Firm* — Miller Nash LLP (57) ABSTRACT

A method of sensing motion in an MRI scanner includes transmitting at least two tones having different frequencies, using intermodulation to combine the two tones, transmitting the two tones as a combined signal during an MRI scan of a patient, receiving the combined signal using a receiver in the MRI scanner, demodulating the combined signal to produce a demodulated signal, and analyzing the demodulated signal to detect motion of the patient during the MRI scan.

17 Claims, 7 Drawing Sheets

BPT and PT results

SENSING MOTION IN MRI USING RF INTERMODULATION

CROSS-REFERENCE TO RELATED APPLICATIONS

This application is a 371 of International Application No. PCT/US2022/016687 filed Feb. 17, 2022, which claims priority to and the benefit of U.S. Provisional Application No. 63/150,423 filed Feb. 17, 2021, which are incorporated herein in their entirety.

STATEMENT REGARDING FEDERALLY SPONSORED RESEARCH AND DEVELOPMENT

This invention was made with government support under Grants Number HL136965, EB009690, and EB029427, awarded by the National Institutes of Health. The government has certain rights in the invention.

TECHNICAL FIELD

This disclosure relates to magnetic resonance imaging (MRI) systems, and more particularly to managing patient motion during MRI scans.

BACKGROUND

MR imaging is slow, taking several minutes to complete. Patients frequently move during the scan time while inside the scanner. Patient motion, including cardiac and respiratory motion, can corrupt the resulting scan data. Measuring the patient motion at multiple spatial and temporal scales and using the motion signals to correct data after acquisition can mitigate these issues.

Some current solutions for motion sensing include using hardware placed on the patient's body or changing the pulse sequence played by the scanner transmit system. Placing hardware on the patient generally involves an ECG to monitor heartbeats and a flexible sensor on the abdomen to monitor breathing. This can cause patient discomfort, and issues arise with pediatric patients or patients with disorders that have uncontrollable motion, such as Parkinson's disease patients.

Additionally, the motion signals from the hardware can be inconsistent between patients, making it hard to implement sequence-specific changes. The acquisition may also corrupt the signals. For example, in the case of ECGs, switching gradient fields and RF excitation may cause artifacts in the ECG waveform.

Alternatively, a method for motion detection that involves no on-patient hardware uses Pilot Tone (PT) navigators. This typically involves playing tones (PTs), which are electromagnetic waves within the MRI receiver bandwidth. PTs are transmitted using an additional transmitter placed inside the bore of the MRI scanner. Subject, or patient, motion modulates the tones received by the receiver coils. The modulated PT contains cardiac and respiratory information, which is easily separated from the image. However, the PT frequency is tied to the MRI center frequency, also referred to as the Larmor frequency, and has a wavelength of 1 to 4.7 meters, corresponding to the field strength of commercial MRI scanners, typically between 7 T and 1.5 T. This limits the sensitivity to motion within the body.

DETAILED DESCRIPTION OF THE EMBODIMENTS

The embodiments here involve a flexible sensing method that offers high sensitivity to both large-scale and small-scale patient motion during an MRI scan. The sensing of the patient motion inside the scanner allows the resulting MRI data to be corrected to account for the motion. The embodiments accomplish this without additional on-subject hardware. On-patient hardware can cause patient discomfort, and issues arise with pediatric patients or patients with disorders that have uncontrollable motion, such as Parkinson's disease patients. The embodiments here can also detect and adjust for respiratory and cardiac motion. The implementations are inexpensive and simple. They offer increased patient comfort, reduced setup, and motion information to correct image data for more accurate scan results.

The embodiments enable motion sensing without additional on-patient hardware, which generally increases patient comfort and reduces setup time. Given the cost of an MRI scan, reducing setup time would result in a huge cost reduction of the overall technology. Further, the embodiments have better sensitivity to sense motion on multiple spatial and temporal scales compared to current solutions such as Pilot Tones (PT). One should note that it is still possible to place the hardware on or very close to the subject. Better signals in cardiac experiments may be obtained by placing a transmitter on a subject's chest.

Figure 1:
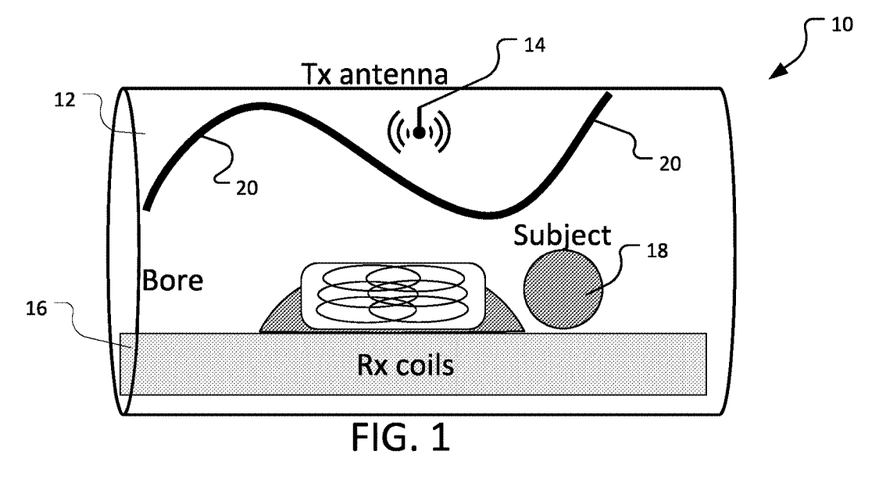
FIG. 1 shows a prior art embodiment of an MRI system.
Figure 2:
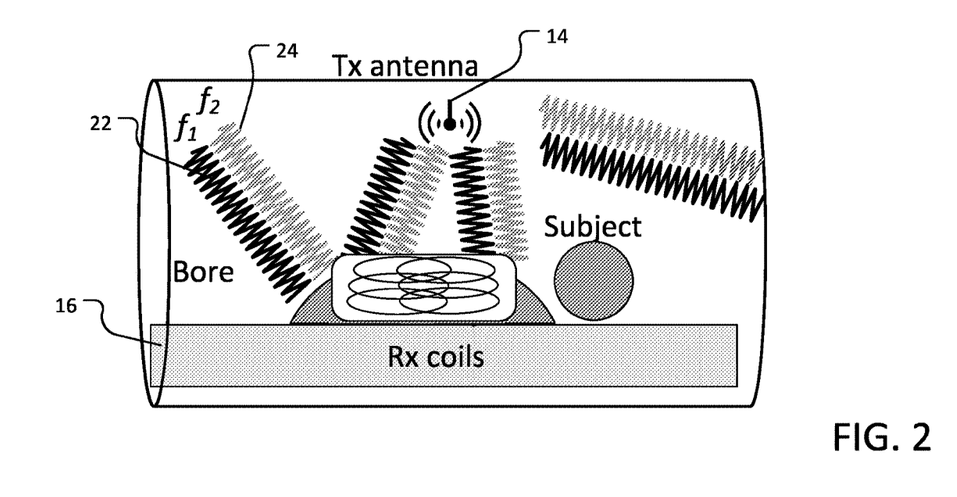
FIG. 2 shows an embodiment of an MRI system.

FIGS. 1 and 2 show a comparison between the waves used in PT, in FIG. 1, and the embodiments here, FIG. 2. In FIG. 1, the wavelength is lower frequency, $f_{PT}$. The MRI system 10 has an inner chamber, referred to here as a bore, 12 in which the patient or subject 18 lies during operation. The antenna 14 transmits signals received by the MRI receive coils 16. In FIG. 1, the antenna 14 transmits a signal at a frequency, $f_{PT}$. As discussed above, $f_{PT}$ is tied to the MRI center frequency, also referred to as the Larmor frequency. The signal has a wavelength of 1 to 4.7 meters or 300 MHz to 63 MHz, corresponding to the field strength of commercial MRI scanners, typically between 7T and 1.5 T. This limits the sensitivity to motion within the body.

In FIG. 2, the antenna transmits two signals at frequencies $f_1$ and $f_2$, which may be set independently of the Larmor frequency. In preliminary experiments, $f_1$ and $f_2$ were set much larger than the Larmor frequency, in one embodiment approximately 19 times larger. In this embodiment, the signals are transmitted from the antenna 14, which may be, but is not required to be, placed inside the bore. The control system of the MRI scanner may implement the embodiments by way of a software change in how the system operates. This approach will be referred to here as Beat Pilot Tone (BPT). It requires no changes to the MRI acquisition, with no changes to the pulse sequence or adverse impact on signal-to-noise ratio, making it usable with any MR imaging sequence. This offers great utility to clinicians, who generally use multiple different imaging sequences within an exam session. The embodiments generalize to higher and lower frequencies.

The embodiments take advantage of the fact the even preamplifiers (preamps) with the most linear responses still exhibit some nonlinear distortions, such as intermodulation. Intermodulation typically means the amplitude modulation of signals containing two or more different frequencies, usually caused by the above-mentioned non-linearities or time variances in a system.

A method of the embodiments transmits two tones at two different frequencies $f_1$ and $f_2$, which are designed to be received at the desired BPT frequency ($f_{BPT}$) by the receiver and mixed to create intermodulation products at the preamplifier of the receiver coil. While $f_1$ and $f_2$ can be much greater than the MR center frequency, the product $f_{BPT}$ falls within the receiver bandwidth. The desired BPT frequency is given by $f_{BPT}=m*f_1+n*f_2$, where m and n are signed integers, and the intermodulation order is abs(m)+abs(n). For instance, for second order intermodulation in which m=1 and n=−1, $f_{BPT}=f_2-f_1$ should lie within the receiver bandwidth ($f_{BPT}$~127.8 MHz at a field strength of 3 T). While the discussion below refers to the receiver as the receiver coil, the receiver may be a radio receiver, including a software-defined radio.

Figure 3:
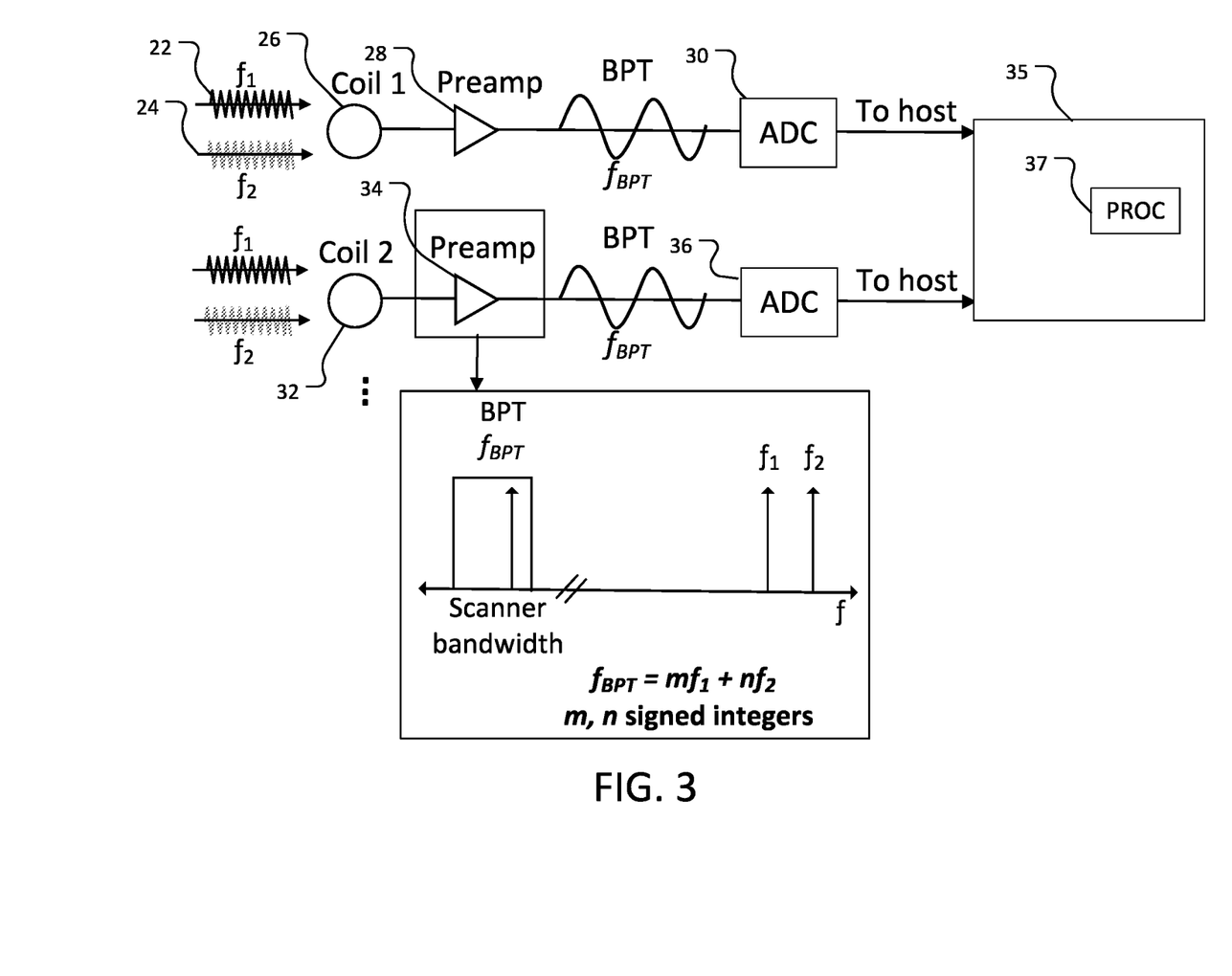
FIG. 3 shows a block diagram of components used in the embodiments.

The inventors have performed experiments, in which $f_1$=2.4 GHz, $f_2$=2.5278 GHz, and used second order intermodulation. However, implementations can use higher order intermodulation, as well as higher or lower frequencies for $f_1$ and $f_2$. FIG. 3 shows a diagram of the overall approach. As shown in FIG. 3, the receiver coils 26 and 32 pick up the signals 22 and 24 as the combined signal. The antenna transmits them as BPT, the preamplification stage of preamps 28 and 34 mixes them via intermodulation, then the receiver chain digitizes them such as using analog-to-digital converters (ADC) 30 and 36. The mixing may be performed by preamplifiers in the MRI scanner or an external device. Similarly, the digitized data may be analyzed by a host computer having one or more processors such as 37. FIG. 3 shows graphical representation of the intermodulation effect from the preamp 28, 34. While FIG. 3 shows only two frequencies $f_1$ and $f_2$, it is possible to use more frequencies and more transmitters.

Figure 4:
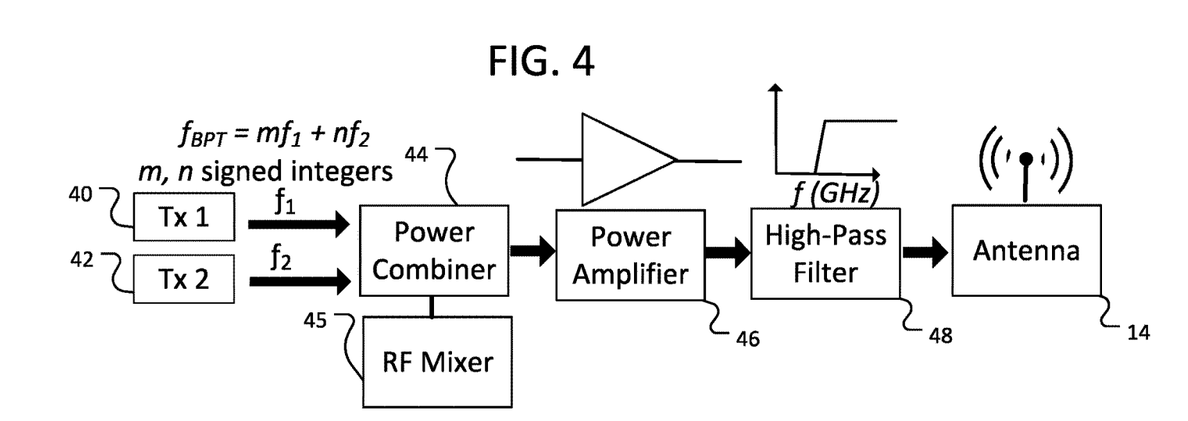
FIG. 4 shows a block diagram of an acquisition path for an MRI system.

It is also possible to create intermodulation by adding a nonlinear device external to the MRI scanner, such as an RF mixer shown as 45 in FIG. 4. Here, the intermodulation would create a BPT that would then be transmitted and sampled by the MRI receiver coils normally. The advantage of this approach is that there may be less transmit power required to produce $f_1$ and $f_2$, since the added device may have more pronounced nonlinearities than the MRI preamplifiers.

Figure 5:
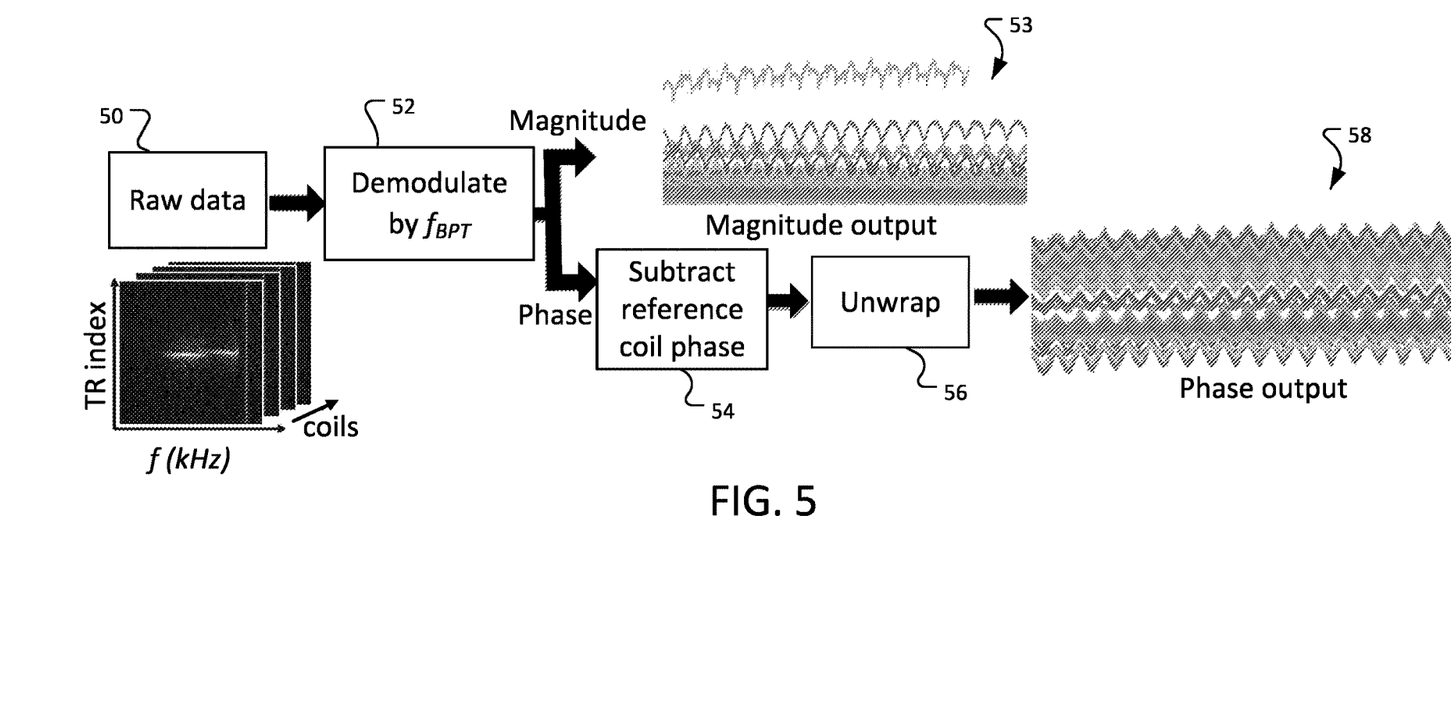
FIG. 5 shows a diagram of a signal reconstruction path.

FIGS. 4 and 5 show the separated acquisition and reconstruction paths for the embodiments. While FIG. 4 shows the pipeline for two transmitters, Tx 1 40 and Tx 2 42, it is possible to use an array of arbitrarily many transmitters, or one transmitter that can transmits two tones. These will be referred to here as one or more transmitters. In FIG. 4, the two signals are generated by the transmitters 40 and 42. A power combiner 44, or RF mixer 45 that may be external to the system, then combines the signals and a power amplifier 46 amplifies them. After the high pass filter 48 filters them, the antenna 14 transmits them as a combined signal. Again, it is possible to have more antennas; however, this figure demonstrates the signal path for a single antenna. The antenna 14 will more than likely have the position shown in FIG. 2, inside the bore above the patient with its plane parallel to the patient, but could reside at many different positions, including on the subject, and may comprise multiple antennas. These components are external to the MRI scanner apparatus, and may be implemented in many different ways. For example, the transmitters may consist of software-defined radios, a generic pure tone generator, etc.

In FIG. 5, the system receives the modulated signals. The raw data 50 is received by the coils or other receiver, such as a software-defined radio. This then undergoes demodulation at 52 by $f_{BPT}$ frequency for all the coils. This allows output of the magnitude shown at 53. In order to unwrap the phase, the system chooses a reference coil and then subtracts the phase of the reference phase from the other coils at 54. This allow unwrapping of the phase output at 56 to produce the phase output shown at 58. The receiver path uses the existing MRI scanner hardware. A separate computer from the MRI computer, such as shown as 35 in FIG. 2, may process the raw data, or the MRI computer may process the data. In one embodiment, the MRI computer may process the data in real time.

Figures 6, 7:
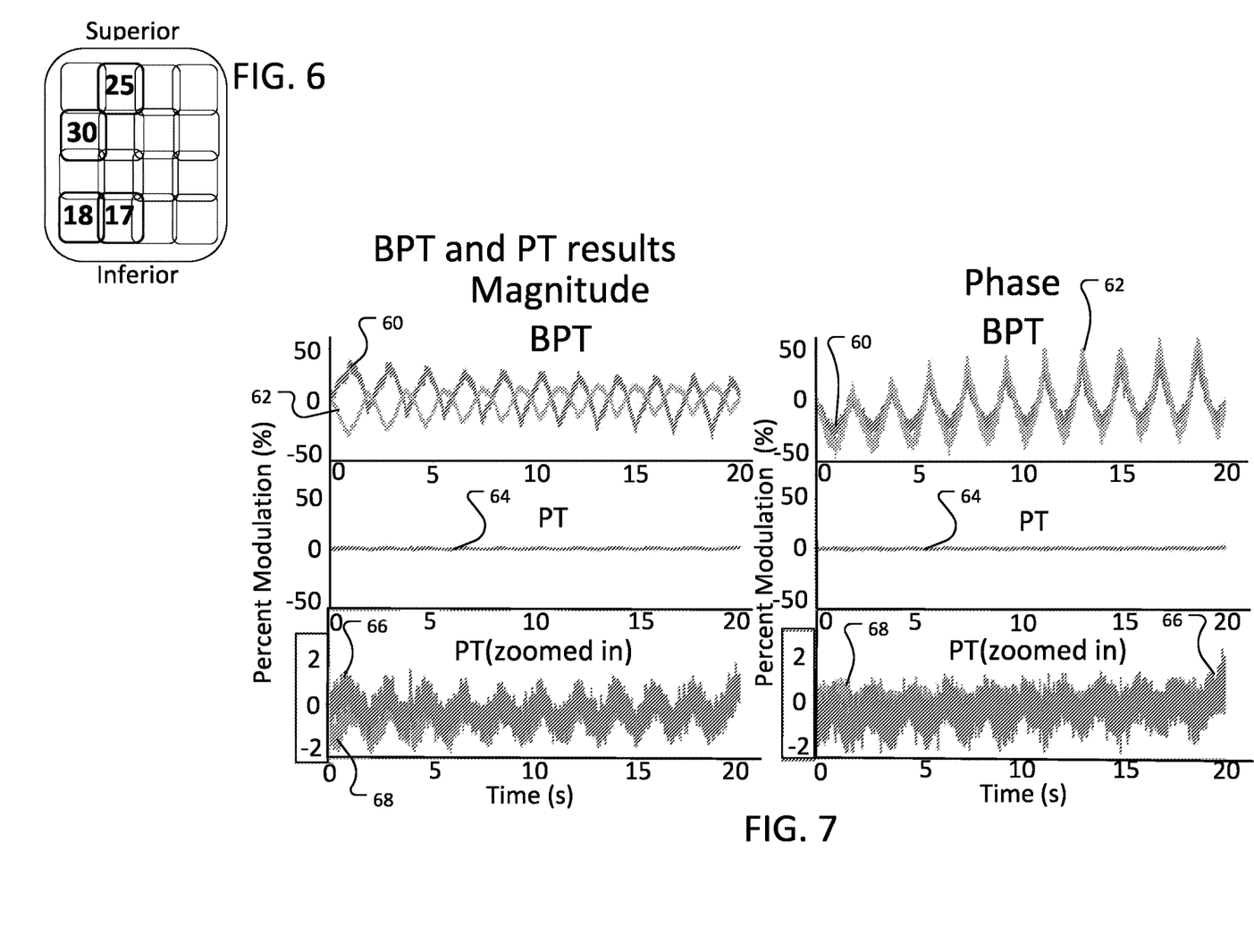
FIGS. 6-7 show results of an experiment using a motion phantom.

FIGS. 6-7 show results from a first experiment using a pneumatic motion phantom that provided motion in the range of 4 cm. The MRI machine scanned the phantom using a two-dimensional steady-state free precession (2D SSFP) sequence used in many MRI systems. FIG. 6 shows the coil arrangement in the body coils, and the most modulated coils in each acquisition. For the BPT acquisition, the most modulated coils were coils 25 and 30, and for the PT acquisition the most modulated were coils 17 and 18.

FIG. 7 shows the magnitude and phase results, with lines labeled 60 corresponding to coil 25, lines labeled 62 corresponding to coil 30, lines labeled 66 corresponding to coil 18, and lines labeled 68 corresponding to coil 17. The line 64 in the middle is the PT acquisition line when set at the same scale as the BPT acquisition data. The lower graph shows the PT acquisition data zoomed in to a much smaller scale shown to the left. In comparing the percent modulation (deviation of the signal from its mean) for amplitude and phase in the upper two graphs shows that BPT has 20× greater modulation in both.

Figures 8, 9:
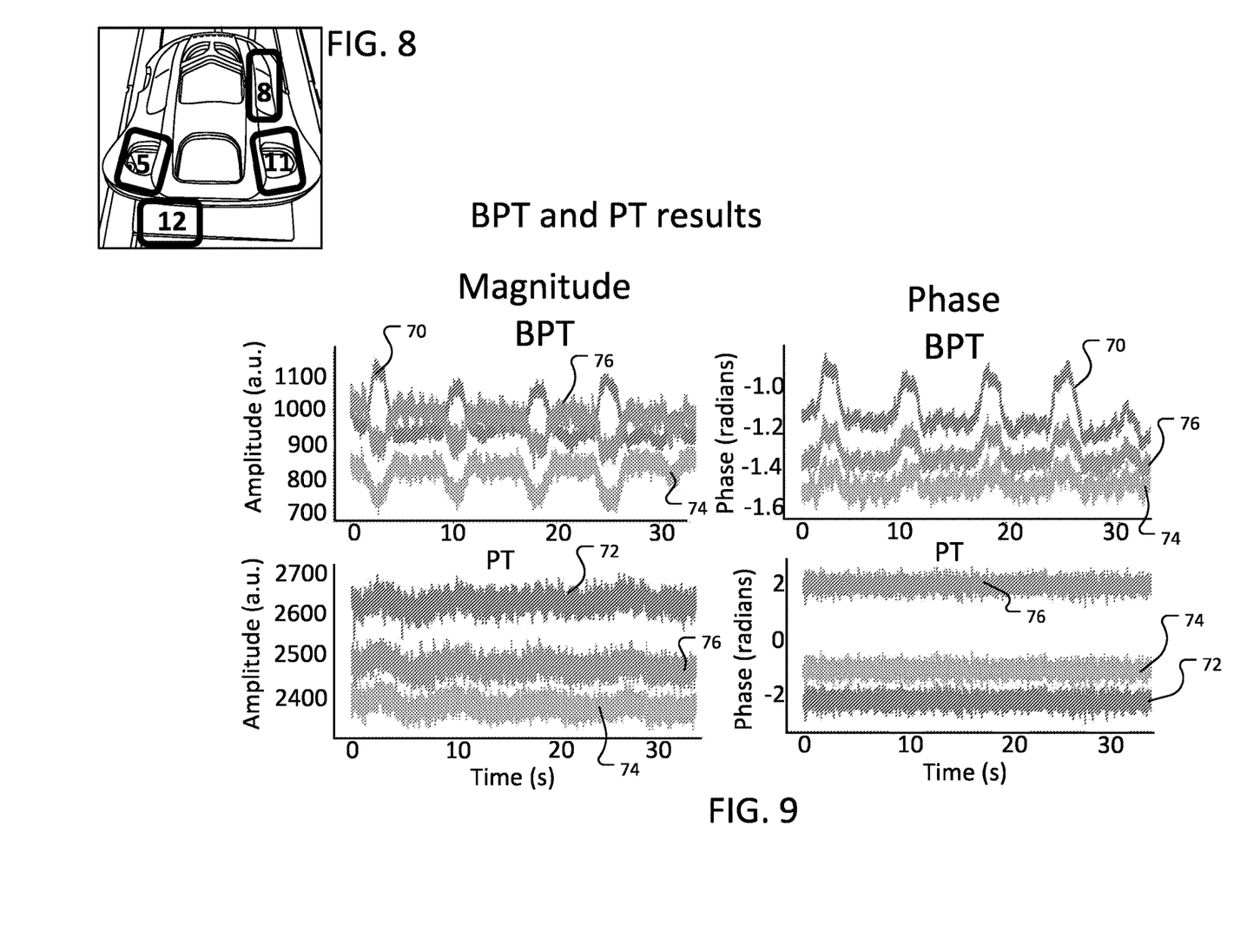
FIGS. 8-11 show results of an experiment using a volunteer.

FIGS. 8-9 show results from a second experiment in which a volunteer lay in the bore and moved their head up and down during the scan, in a range of 2 cm. FIG. 8 shows the most modulated coils for the head scan, with BPT having coils 5, 11 and 12 as the most modulated, and PT having coils 8, 11 and 12 as the most modulated. The graphs in FIG. 9 have labeled the coil curves 70 for coil 5, 72 for coil 8, 74 for coil 11, and 76 for coil 12, in order. One can see in both the magnitude and phase graphs for BPT, the magnitude and phase data both show the head motion as indicated by the peaks in the curve 70 for coil 5, but the PT data does not.

Figures 10, 11:
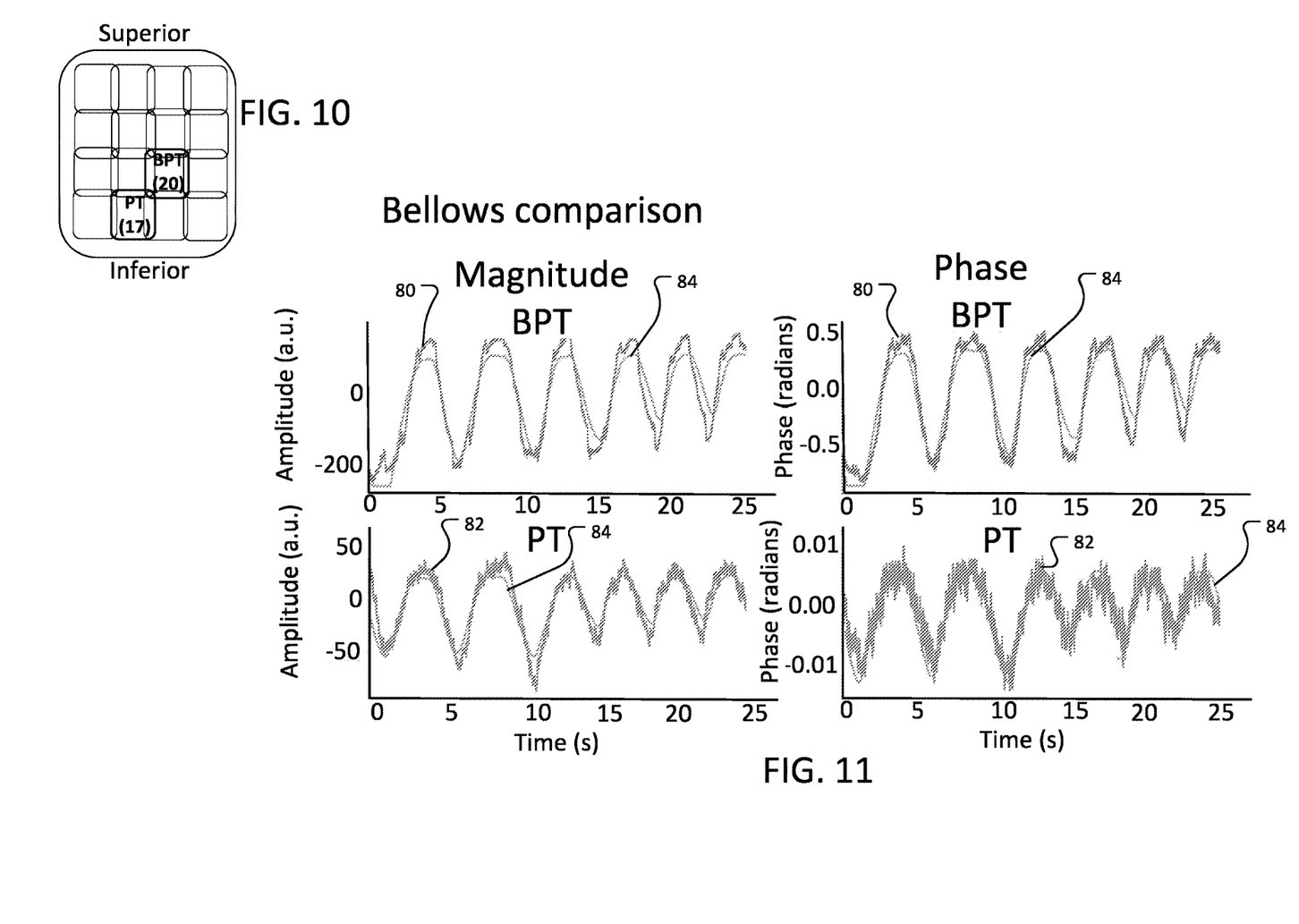

FIGS. 10-11 show the results for the bellows signals from the abdominal scan. FIG. 10 shows the positions of the two most modulated body coils, coil 20 for the BPT scan and coil 17 for the PT scan. FIG. 11 has coil 20 data labeled as 80, coil 17 labeled as 82, and the bellows data as 84. In FIG. 11, the BPT and PT magnitudes and phases were filtered with a moving average and scaled to match the bellows signal, which they match closely.

Figure 12:
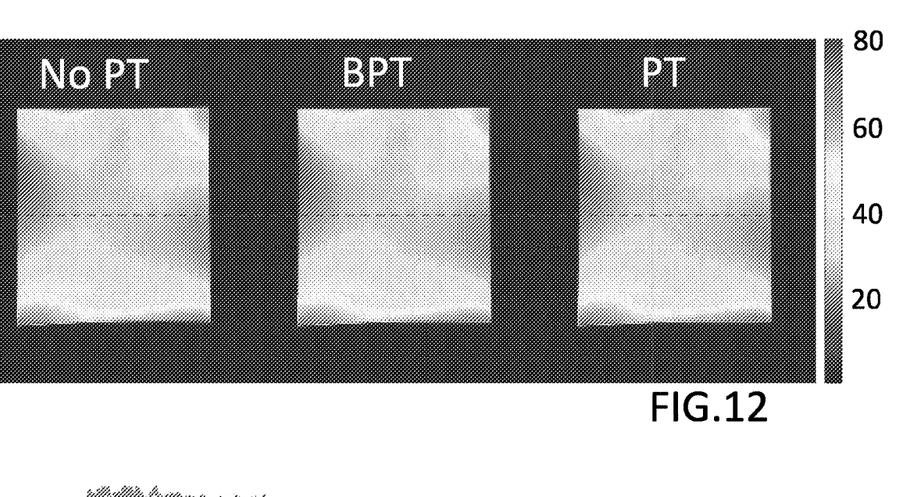
FIGS. 12-13 show signal-to-noise ratios for images captured.
Figure 13:
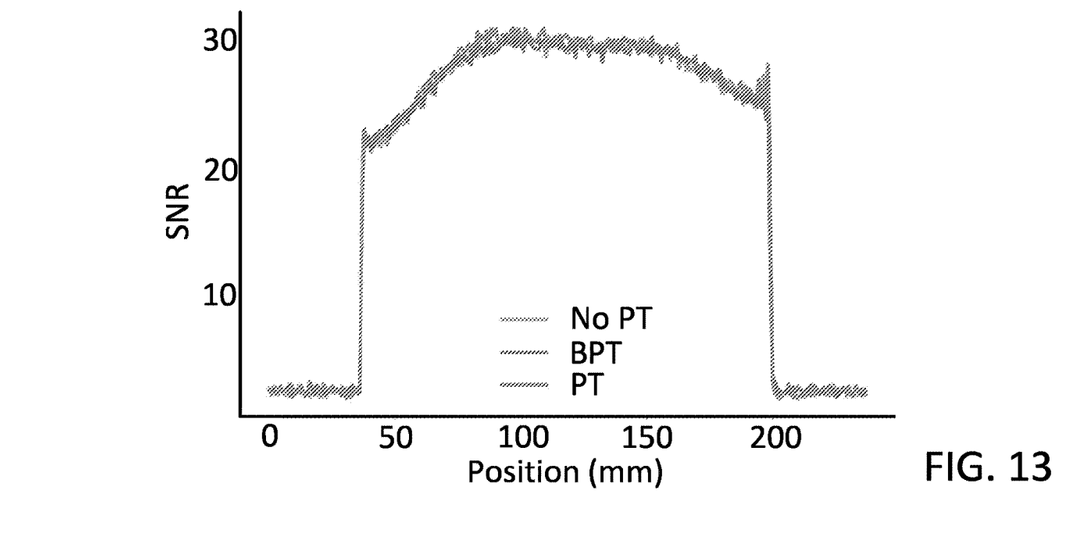

FIGS. 12-13 show the image signal-to-noise (SNR) ratio in three acquisitions, one with no PT, one with BPT only and one with PT only. FIG. 12 shows the SNR maps across the three acquisitions using a uniform phantom with a 32-channel body coil. FIG. 13 shows line plots through the center of the maps, indicated by the dashed line in FIG. 12. The almost identical matching of the three plots in FIG. 13 shows that neither the BPT nor the PT affects the SNR of the MRI scanner. This increases the likelihood of adoption, as the use will not adversely affect the MRI signals.

The embodiments allow for better detection of motion in MRI bores. This provides the ability to adjust the resulting scan data to account for patient motion and produce more accurate results. As shown above, the BPT approach detects motion with a much higher sensitivity than PT. The BPT embodiments may involve inexpensive, readily available hardware and have little or no effect on the raw MRI data.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the claims.

What is claimed is:

1. A method of sensing motion in an MRI scanner, comprising:
   transmitting at least two tones having different frequencies;
   mixing the at least two tones using intermodulation to combine the two tones into a combined signal within MRI receiver bandwidth;
   transmitting the two tones as the combined signal during an MRI scan of a patient;
   receiving the combined signal using a selected receiver coil from one or more existing receiver coils in the MRI scanner;
   demodulating the combined signal to produce a demodulated signal; and
   analyzing the demodulated signal to detect motion of the patient being scanned during the MRI scan.

2. The method as claimed in claim 1, wherein the mixing is passively performed at a preamplifier of the selected receiver coil of the MRI scanner.

3. The method as claimed in claim 1, wherein the mixing is performed by a device external to the MRI scanner.

4. The method as claimed in claim 1, further comprising digitizing the demodulated signal.

5. The method as claimed in claim 1, wherein demodulating the combined signal comprises outputting the magnitude and the phase of the combined signal.

6. The method as claimed in claim 1, wherein outputting the phase of the combined signal comprises:
   selecting one of the receiver coils as a reference coil; and
   subtracting a phase of the reference coil from other of the one or more receiver coils to produce the phase output.

7. The method as claimed in claim 1, further comprising amplifying the combined signal prior to transmitting.

8. The method as claimed in claim 1, further comprising high-pass filtering the combined signal prior to transmitting.

9. The method as claimed in claim 1, wherein transmitting the at least two tones further comprises selecting the at least two tones such that a frequency determined by frequencies of the two tones falls within a receiver bandwidth of the MRI scanner.

10. The method as claimed in claim 9, wherein a product of the two tones equals a frequency of a first tone multiplied by a first signed integer added to a frequency of a second tone multiplied by a second signed integer.

11. The method as claimed in claim 1, wherein receiving the combined signal comprises receiving the combined signal at one of a set of the selected receiver coil, a software-defined radio, or an external radio receiver.

12. A motion sensing system for a MRI scanner, comprising:
    one or more transmitters to generate at least two different frequency tones;
    a mixer to mix the at least two different frequency tones using intermodulation to produce a mixed signal having a frequency within a frequency of a receiver of the MRI scanner;
    one or more antennas to transmit the mixed signal into a bore of the MRI scanner occupied by a patient;
    a receiver in the MRI scanner to receive the mixed signal; and
    one or more processors to execute code to analyze the mixed signal to determine patient motion.

13. The motion sensing system as claimed in claim 12, wherein the mixer comprises one of a preamplifier or an RF mixer.

14. The motion sensing system as claimed in claim 12, wherein the one or more processors resides in the MRI scanner.

15. The motion sensing system as claimed in claim 12, wherein at least one of the one or more processors reside in a computer external to the MRI scanner.

16. The motion sensing system as claimed in claim 12, wherein the one or more transmitters comprises one of software-defined radios or pure tone generators.

17. The motion sensing system as claimed in claim 12, wherein the receiver comprises one of either receiver coils in the MRI scanner, a software-defined radio, or other radio receiver.

* * * * *